UNITED STATES PATENT OFFICE.

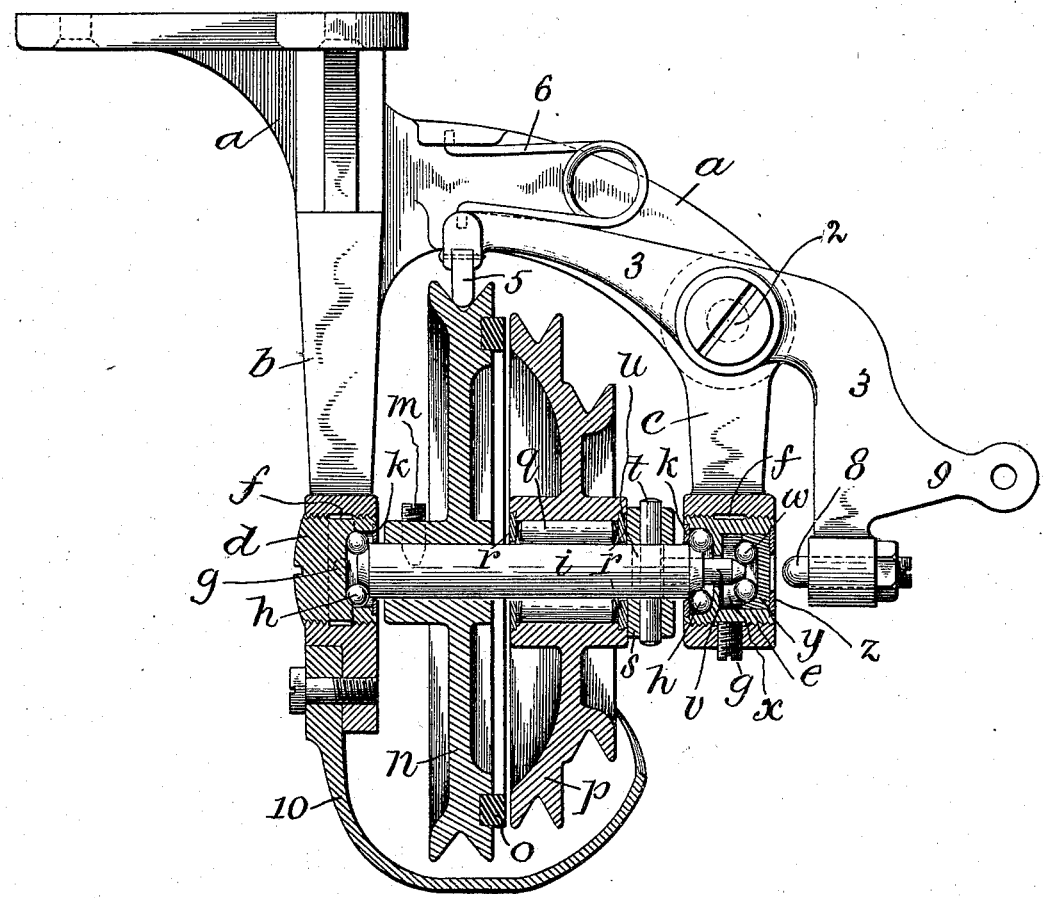

PHILIP DIEHL AND WILLIAM SCHRAMM, OF ELIZABETH, NEW JERSEY, ASSIGNORS TO THE SINGER MANUFACTURING COMPANY, OF NEW JERSEY.

POWER-TRANSMITTER.

SPECIFICATION forming part of Letters Patent No. 668,166, dated February 19, 1901.

Application filed May 10, 1900. Serial No. 16,224. (No model.)

*To all whom it may concern:*

Be it known that we, PHILIP DIEHL and WILLIAM SCHRAMM, citizens of the United States, residing at Elizabeth, in the county of Union and State of New Jersey, have invented certain new and useful Improvements in Power-Transmitters, of which the following is a specification, reference being had therein to the accompanying drawing.

This invention relates to that class of friction-clutch power-transmitters by which motion may be conveyed when desired from a continuously-rotating driving wheel or pulley to a driven wheel or pulley; and the invention has for its object to provide a ball-bearing power-transmitter of the class referred to of such construction that no disturbance of the ball-bearings will occur in clutching and unclutching and which will also avoid side thrust or pressure on the ball-bearings as far as possible when the driving wheel or pulley is forced or pressed into frictional contact with the driven wheel or pulley.

The accompanying drawing is a sectional elevation of a power-transmitter embodying the invention.

Referring to the drawing, $a$ denotes a bracket adapted to be attached to the under side of a work table or bench on which sewing or other machines to be driven may be mounted. The bracket $a$ has two depending rigid arms $b$ and $c$, into which are screwed or otherwise secured the ball-holding boxes or plugs $d$ and $e$, each of said boxes or plugs being preferably provided with a peripheral groove or recess $f$ to be engaged by set-screws $g$ to hold said boxes or plugs in place, the said grooves or recesses being somewhat wider than the diameters of the engaging portions of the said set-screws, so as to admit of a certain limited adjustment of the said ball-holding boxes or plugs for the purpose of taking up wear of the ball-bearings when the said set-screws are loosened. The balls $h$, surrounding the tapered ends of the shaft $i$, are retained in the boxes or receptacles $d$ and $e$ by washers $k$, preferably secured in said boxes by means of slightly-undercut gains formed in the ends of said boxes, and into which gains the said washers, originally formed slightly crowning or convex in their outer sides, are pressed.

To the shaft $i$ is secured by a set-screw $m$ the driven wheel or pulley $n$, preferably having a friction-ring $o$ secured in one face. Mounted to rotate loosely on the shaft $i$ is the driving wheel or pulley $p$, to be rotated by a belt from any suitable source of power. The driving wheel or pulley $p$ preferably runs on a circular series of bearing-rollers $q$, retained in the hub of said pulley by washers $r$ pressed into undercut gains in the ends of said hub.

The shaft $i$ is provided with a collar $s$, mounted loosely on said shaft, so as to be capable of a slight movement longitudinally or endwise of the latter, said collar being attached to said shaft, so as to rotate therewith, by a pin $t$, driven tight into said collar, but passing loosely through a slot $u$ in said shaft, said slot permitting of a limited sliding movement of said collar on said shaft. The shaft $i$ is recessed axially at one end for the reception of a loosely-fitting sliding pin $v$, movable lengthwise of said shaft and abutting at its inner end against the pin $t$, said pin $v$ preferably having a tapered outer end encircled by balls $w$, received in a recess $x$ in the outer side of the box or plug $e$. Contiguous to the balls $w$ and fitting loosely in the recess $x$ is a disk or cup $y$, retained in said recess by the washer $z$, secured in an undercut gain in the outer end of the box $e$.

Pivotally mounted at 2 on the arm $c$ of the bracket $a$ is a lever 3, the upper arm of which is provided with a friction block or brake 5, to be pressed against the rim or periphery of the driven wheel or pulley $n$ by a spring 6. The lower arm of the lever 3 is provided with a pin or plug 8, arranged to engage the disk or cup $y$, and the said lower arm is provided with an extension 9, to be connected with a suitable treadle to operate said lever in opposition to the stress of the spring 6 when the driving wheel or pulley $p$ is to be forced into frictional engagement with the wheel or pulley $n$ to be driven.

Attached to the arm $b$ of the bracket $a$ is a dress-guard 10, extending beneath the driving and driven pulleys.

From the foregoing it will be understood that the ball-bearings for the shaft $i$ may be so accurately adjusted that there will be no appreciable endwise movement of said shaft when the driving wheel or pulley is moved laterally into or out of frictional contact with the driven wheel or pulley, and it will also be understood that the ball-bearings of said shaft are in no wise disturbed by the lateral movement of the said driving-wheel in clutching or unclutching. When the attendant moves the lever 3 in opposition to the stress of the spring 6, the pin $v$ is forced inward against the pin $t$, causing the collar $s$ to press the driving wheel or pulley $p$ into clutching frictional contact with the driven wheel or pulley $n$ to set the latter in motion, and when the attendant releases the treadle the spring 6 automatically restores the parts to their normal positions and applies the brake 5 to the driven wheel or pulley $n$ to arrest the motion thereof. It will thus be seen that the clutching operation causes no side thrust whatever on the ball-bearing in the box or plug $e$ and that the side thrust on the other bearing in the box $d$ is all taken up by the balls in said box, while the accurate running adjustment of the ball-bearings is in no wise disturbed by the clutching and unclutching operations. By mounting the continuously-running driving-pulley $p$ on the shaft $i$ by means of the comparatively long antifriction bearing-rollers $p$ the wear between said pulley and shaft is reduced to a minimum, while the free lateral or sidewise movement of said pulley on said shaft is not in the least interfered with.

This invention is not necessarily limited to all of the details herein shown and described, although the best or preferred form of the invention, so far as now known, is herein set forth. The endwise-movable pin $v$ need not necessarily have a ball-bearing in the box $e$, although this ball-bearing is preferably employed.

Having thus described our invention, we claim and desire to secure by Letters Patent—

1. In a friction-clutch power-transmitter, the combination with a supporting-bracket having two rigid arms provided with ball-holding receptacles or boxes, of a shaft running on the balls in said boxes, a driven wheel or pulley, a driving wheel or pulley running independently of said driven wheel or pulley and means for forcing said driving wheel or pulley into frictional driving contact with said driven wheel or pulley.

2. In a friction-clutch power-transmitter, the combination with a supporting-bracket having two rigid arms provided with fixed ball-receptacles, a shaft running on the balls in said receptacles but stationary as to endwise movement, a driven wheel or pulley fixed to said shaft, a driving wheel or pulley loosely mounted on said shaft, and means for forcing said driving wheel or pulley into frictional driving contact with said driven wheel or pulley.

3. In a friction-clutch power-transmitter, the combination with a supporting-bracket provided with two fixedly-mounted ball-bearings, of a shaft running on said ball-bearings, a driven wheel or pulley fixed to said shaft, a driving wheel or pulley loosely mounted on said shaft, a sliding pin or device movable lengthwise to and independently of said shaft, means for operating said sliding pin or device for conveying the movements thereof to said driving wheel or pulley to cause the latter to be frictionally engaged with the said driven wheel or pulley.

4. In a friction-clutch power-transmitter, the combination with a supporting-bracket provided with ball-bearings in fixed receptacles, of a shaft running on said ball-bearings and stationary as to endwise movement, a driven wheel or pulley fixed to said shaft, a driving-wheel running independently of said driven wheel and mounted on antifriction-bearings, and means for forcing said driving and driven wheels together into frictional running contact.

5. In a friction-clutch power-transmitter, the combination with a supporting-bracket provided with two fixed ball-bearings, of a shaft running on said ball-bearings and stationary as to endwise movement, a driven wheel or pulley fixed to said shaft, a driving wheel or pulley running loose on said shaft and movable toward and from said driven wheel or pulley, antifriction bearing-rollers interposed between the hub of said driven wheel or pulley and the said shaft, and means for forcing said driving wheel or pulley into frictional driving contact with said driven wheel or pulley.

6. In a friction-clutch power-transmitter, the combination with the bracket $a$ having the arms $b$ and $c$, of the ball-holding boxes $d$ and $e$ fixed to said arms, the shaft $i$ running on the balls in said boxes but stationary as to endwise movement, the driven wheel or pulley $n$ fixed to said shaft, the driving wheel or pulley $p$ loosely mounted on said shaft and having in its hub a series of bearing-rollers encircling said shaft, and means for forcing said driving and driven wheels into frictional running contact.

7. In a friction-clutch power-transmitter, the combination with the bracket $a$ having the rigid depending arms $b$ and $c$, of the ball-holding boxes $d$ and $e$ fixed in said arms, the shaft $i$ running on the balls in said boxes but stationary as to endwise movement, the driven wheel or pulley $n$ rigid with said shaft, the driving wheel or pulley $p$ loosely mounted on said shaft and having in its hub a series of bearing-rollers encircling said shaft, the loose collar $s$ on said shaft, the pin $t$ loosely passing through said shaft and tightly fitting in said collar, the sliding pin $v$ axially mounted in said shaft and abutting at its inner end against the said pin $t$, and a lever pivotally supported by said bracket and serving to operate the said sliding pin $v$ to cause the said driving wheel or pulley to be frictionally engaged with said driven wheel or pulley.

In testimony whereof we affix our signatures in the presence of two witnesses.

PHILIP DIEHL.
WILLIAM SCHRAMM.

Witnesses:
HENRY CALVER,
HENRY J. MILLER.